United States Patent

Quantrille et al.

[11] Patent Number: 5,393,599
[45] Date of Patent: * Feb. 28, 1995

[54] COMPOSITE NONWOVEN FABRICS

[75] Inventors: Thomas E. Quantrille, Simpsonville; G. Stanley Zimmerman, Jr., Greenville, both of S.C.

[73] Assignee: Fiberweb North America, Inc., Simpsonville, S.C.

[*] Notice: The portion of the term of this patent subsequent to Aug. 2, 2011 has been disclaimed.

[21] Appl. No.: 96,706

[22] Filed: Jul. 23, 1993

Related U.S. Application Data

[63] Continuation-in-part of Ser. No. 825,016, Jan. 24, 1992, Pat. No. 5,334,446.

[51] Int. Cl.⁶ .............. B32B 5/16; B32B 27/36; B32B 5/22; B32B 31/08
[52] U.S. Cl. ................. 428/284; 428/109; 428/152; 428/198; 428/283; 428/287; 428/296; 428/299; 428/326; 428/903; 156/163; 156/164; 156/229
[58] Field of Search ........... 428/109, 152, 198, 283, 428/284, 287, 296, 299, 326, 903, 107, 113, 114, 230, 247, 255; 156/163, 164, 229

[56] References Cited

U.S. PATENT DOCUMENTS

| | | | |
|---|---|---|---|
| 2,982,680 | 5/1961 | Ellis et al. | 428/152 |
| 3,519,530 | 7/1970 | Struble, Jr. | 428/152 |
| 3,597,299 | 7/1968 | Thomas et al. | 428/154 |
| 3,600,262 | 8/1971 | Frank | 161/79 |
| 3,765,997 | 10/1973 | Dunning | 428/172 |
| 3,769,119 | 10/1973 | Mizell et al. | 428/172 |
| 3,775,231 | 11/1973 | Thomas | 428/152 |
| 4,302,495 | 11/1981 | Marra | 428/110 |
| 4,413,623 | 11/1983 | Pieniak | 156/229 |
| 4,450,026 | 5/1984 | Pieniak et al. | 156/229 |
| 4,525,407 | 6/1985 | Ness | 156/229 |
| 4,542,060 | 9/1985 | Yoshida et al. | 428/284 |
| 4,551,378 | 11/1985 | Carey, Jr. | 428/198 |
| 4,606,964 | 8/1986 | Wideman | 428/152 |
| 4,636,419 | 1/1987 | Madsen et al. | 156/494 |
| 4,681,801 | 7/1987 | Eian et al. | 428/284 |
| 4,731,276 | 3/1988 | Manning et al. | 428/284 |
| 4,734,311 | 3/1988 | Sokolowski | 428/229 |
| 4,775,579 | 10/1988 | Hagy et al. | 428/284 |
| 4,786,549 | 11/1988 | Richards | 428/225 |
| 4,847,134 | 7/1989 | Fahrenkrug et al. | 428/229 |
| 4,863,779 | 9/1989 | Daponte | 428/284 |
| 4,939,016 | 7/1990 | Radwanski et al. | 428/225 |
| 4,970,104 | 11/1990 | Radwanski | 428/152 |
| 4,977,011 | 12/1990 | Smith | 428/292 |
| 4,984,584 | 1/1991 | Hansen et al. | 428/152 |
| 5,200,246 | 4/1993 | Sabee | 428/113 |

FOREIGN PATENT DOCUMENTS

| | | |
|---|---|---|
| 0007802 | 2/1980 | European Pat. Off. |
| 2364958 | 7/1975 | Germany. |
| 1453701 | 10/1976 | United Kingdom. |

*Primary Examiner*—Kathryne E. Shelborne
*Attorney, Agent, or Firm*—Bell, Seltzer, Park & Gibson

[57] ABSTRACT

The invention provides elastic fabrics which exhibit low extensibility in the machine direction and have substantial elastic properties in the cross-machine direction. The fabrics of the invention include an elastic layer and a fibrous layer which are combined together. The fibrous layer is composed of a plurality of thermally activated binder fibers or filaments oriented substantially in the machine-direction of the fibrous web. The fabrics of the invention can be manufactured and processed more readily than fabrics which are elastic in both the machine direction and the cross-machine direction.

28 Claims, 2 Drawing Sheets

COMPOSITE NONWOVEN FABRICS

RELATED APPLICATIONS

This application is a continuation-in-part of Ser. No. 825,016 now U.S. Pat. No. 5,334,446 filed Jan. 24, 1992 for "Composite Elastic Nonwoven Fabric" by Thomas E. Quantrille, et al.

FIELD OF THE INVENTION

The invention relates to composite elastic nonwoven fabrics and to processes for producing them. More specifically, the invention relates composite nonwoven fabrics having desirable coherency, strength, conformability, and stretch and recovery properties.

BACKGROUND OF THE INVENTION

Nonwoven elastic fabrics have been the subject of considerable attention and effort. Elastic fabrics are desirable for use in bandaging materials, garments, diapers, supportive clothing and personal hygiene products because of their ability to conform to irregular shapes and to allow more freedom of body movement than fabrics with limited extensibility.

Elastomeric materials have been incorporated into various fabric structures to provide stretchable fabrics. In many instances, such as where the fabrics are made by knitting or weaving, there can be a relatively high cost associated with the fabric. In cases where the fabrics are made using nonwoven technologies, the fabric can suffer from insufficient strength and only limited stretch and recovery properties.

Elastomers used to fabricate elastic fabrics often have an undesirable rubbery feel. This is particularly true with thermoplastic elastomers rather than cross-linked elastomers. When these materials are used in composite nonwoven fabrics, the hand and texture of the fabric can be perceived by the user as sticky or rubbery and therefore undesirable.

Nonwoven fabrics having thermoplastic elastomers incorporated into the fabric structure can be extremely difficult to process and to manufacture. For example, tension control during fabric manufacture and/or during downstream processing can be extremely critical. A small change in tension can result in stretching or recovery of the fabric which can lead to a non-uniformly manufactured product. Tension control is even more aggravated when heating is required, for example, during fabric drying, adhesive application, lamination, thermal bonding or other thermal treatment. When subjected to heat and tension, the fabric can stretch and otherwise distort more readily than when the fabric is at room temperature. In addition, thermoplastic elastomers can lose elastic properties when stressed at elevated temperatures and allowed to cool partially or fully while under such stress, and/or the thermoplastic fibers and filaments are apt to break, thereby causing the elastic fabric to lose a portion or all of its elastic properties. Still further, when elastic fabrics are wound into rolls, stretching of the fabrics can occur during the winding process and the fabric can lose elastic properties during its subsequent storage due to the phenomenon of creep.

Yet another difficulty encountered when processing and manufacturing nonwoven fabrics having thermoplastic elastomers incorporated therein is coverage ability. When elastic fabrics are stretched, the webs are reduced in thickness, and exhibit a corresponding decrease in coverage ability, i.e., exhibit voids or thin areas in the fabric.

U.S. Pat. No. 4,775,579 to Hagy, et al. discloses desirable composite elastic nonwoven fabrics containing staple textile fibers intimately hydroentangled with an elastic web or elastic net. One or more webs of staple textile fibers and/or wood pulp fibers can be hydroentangled with an elastic net according to the disclosure of this invention. The resulting composite fabric exhibits characteristics comparable to those of knit textile cloth and possesses superior softness and extensibility properties. The rubbery feel traditionally associated with elastomeric materials can be minimized or eliminated in these fabrics.

U.S. Pat. No. 4,413,623 to Pieniak discloses a laminated structure such as a disposable diaper which can incorporate an elastic net into portions of the structure. The elastic net can be inserted in a stretch position between first and second layers of the structure and bonded to the layers while in the stretch condition. Subsequent relaxation of the elastic net can result in gathering of the structure.

U.S. Pat. No. 4,525,407 to Ness discloses elastic fabrics which include an elastic member which may be an elastic net intermittently bonded to a substrate which prior to stretching is less easily extensible than the elastic member. The non-elastic member is bonded to the elastic member and the entire composite is rendered elastic by stretching and relaxation.

U.S. Pat. No. 4,606,964 to Wideman discloses a bulk composite web which can be prepared by bonding a gatherable web to a differentially stretched elastic net. Subsequent relaxation of the differentially stretch net is said to result in gathering of the fabric.

The various problems associated with thermoplastic elastomeric materials, as discussed previously, render many of these and other composite elastic fabrics difficult to manufacture and process. There are problems with tension control, elongation under the tension induced by converting machines, irregular cut length, poor tracking, blocking, coverage ability and similar problems. In the past, these problems have been overcome or minimized only with substantial difficulty. To minimize the problem of machine direction stretching during fabric converting and/or forming, for example, typical approaches have been to either cool the thermoplastic elastomer to a temperature below its glass transition temperature or to make "heat activated" materials that are rigid, but then shrink and become elastomeric when heated. These steps are often required to process the material under acceptable tension levels even at ambient temperatures. Alternative process modifications have required extremely exact tension control mechanisms. These, however, do not consistently eliminate problems during normal fabric processing.

SUMMARY OF THE INVENTION

The present invention provides composite elastic nonwoven fabrics which can be readily processed on existing fabric processing and converting equipment without requiring special tension control mechanisms and without substantial harm to the elastic properties of the fabric. The fabrics can be subjected to heat during the process of manufacturing the fabrics or thereafter without destruction of elastic properties. Thus, elastic fabrics of the invention can be manufactured in a more convenient and straightforward manner and can be processed thereafter with less restrictions and/or fabric damage than prior elastic fabrics.

The composite elastic fabrics of the invention have a predetermined width and an indeterminate length which is substantially greater than the width of the fabric. The width of the fabric defines the fabric's cross-machine direction and the length of the fabric defines the machine direction of the fabric. The composite elastic fabrics of the invention exhibit low extensibility in the machine direction and have substantial elastic properties in the cross-machine direction. Thus, the fabrics of the invention can be stressed in the machine direction without substantial fabric stretching and without requiring specialized processes and/or apparatus to compensate for elastic stretching. Moreover, because elastomeric components of the fabric are not substantially stressed in the machine direction during fabric processing, thermal treatments can be more readily applied to the fabric without substantial fabric harm as a result of combined thermal and stress effects.

The composite elastomeric nonwoven fabric of the invention includes at least one fibrous web and an elastomeric layer, such as an elastomeric web, net or apertured film, combined with the fibrous web. The fibrous web is composed of a plurality of thermally activated binder fibers or filaments oriented substantially in the machine-direction of the fibrous web, in contrast to the typically random fiber or filament orientation of traditional nonwoven fabrics. The thermally activated, machine direction oriented binder fibers or filaments result in low extensibility of the composite elastic fabric in the machine direction. Nevertheless, the fabric retains substantial elasticity in the cross-machine direction. Because of the orientation of the fibers or filaments, the fibrous nonwoven web has a greater tensile strength in the machine direction as compared to the cross machine direction thereof.

In a preferred embodiment, the elastomeric layer is combined with the fibrous web by hydroentangling, and the composite fabric is thereafter treated to thermally activate at least a portion of the binder fibers or filaments to bond the hydroentangled fabric into a coherent substantially unitary structure.

As compared to nonwoven fabrics which exhibit either low extensibility or full elasticity, the composite fabrics of the invention have various advantages and benefits. As compared to low extensible fabrics, the fabrics of the invention are advantageous in providing elastic properties in the cross-machine direction. As compared to conventional elastic nonwoven fabrics which are elastic in both the machine direction and the cross-machine direction, the fabrics of the invention provide significant benefits and advantages both in terms of their manufacture and their subsequent use. The fabrics of the invention can be manufactured and processed without the need for specialized tension control. When thermally treated while being processed in the machine direction, the fabrics of the invention typically do not lose elastic properties because the elastic filaments are not subjected to substantial elongation. The fabrics of the invention can be readily cut without deformation during the cutting process so that the cut length can be more accurately controlled. Similarly the fabric allows for more accurate treatment and control in other converting processes. The fabrics of the invention can be readily wound and stored in roll form under various environmental conditions without subjecting the elastic components of the fabric to stresses which would result in creep of the fabric. In addition, the fabrics of the invention can provide significant aesthetic benefits including differential drape, curl and shear properties which are not readily provided in fully elastic and low extensibility composite fabrics.

BRIEF DESCRIPTION OF THE DRAWINGS

In the drawings which form a portion of the original disclosure of the invention.

DETAILED DESCRIPTION OF THE INVENTION

In the following detailed description of the invention, specific preferred embodiments of the invention are described to enable a full and complete understanding of the invention. It will be recognized that it is not intended to limit the invention to the particular preferred embodiments described, and although specific terms are employed in describing the invention, such terms are used in the descriptive sense for the purpose of illustration and not for the purpose of limitation. It will be apparent that the invention is susceptible to variation and changes within the spirit of the teachings herein.

Figure 1:
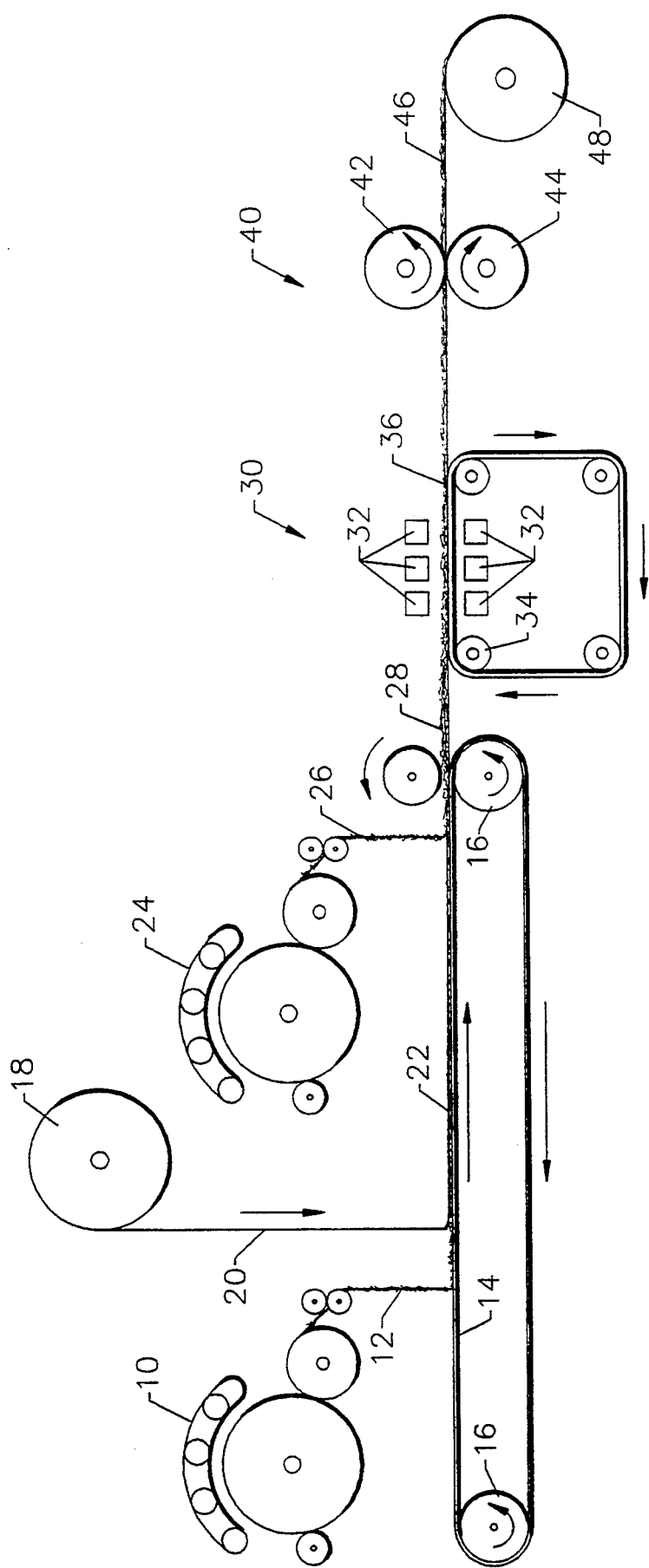
FIG. 1 is a schematic illustration of one preferred process for producing a fabric in accordance with the invention.

FIG. 1 schematically illustrates one preferred process and apparatus for forming the composite nonwoven webs of the invention. A carding apparatus 10 forms a first carded layer 12 onto forming screen 14. Carded fibrous layer 12 includes binder fibers in an amount of between about 5% and about 50% by weight, preferably about 10% to about 40%, and more preferably about 15% to about 30% by weight. Additionally, carded fibrous layer 12 also includes synthetic or natural fibers. As explained in greater detail below the fibers are highly oriented in the machine direction of carded web 12 to impart substantially low extensibility in the machine-direction to the composite structure provided by the invention. The term "low extensibility" as used herein refers to the elongation of the fabric at a given load, i.e., defined generally for purposes of this application as less than about 2% elongation in the machine direction with a tension of about 0.9 N/inch (approximately 0.2 pounds/inch), and more preferably less than about 0.7% elongation, at 25° C.

As known in the art, carding is a mechanical process whereby clumps of staple fibers are separated into individual fibers and simultaneously made into a coherent web. The operation is carried out on a machine which utilizes opposed moving beds of fine, angled closely spaced needles or their equivalent to pull and tease the clumps apart. The term "card clothing" refers to the structure comprised of needles, wires or fine metallic teeth embedded in a heavy cloth or a metal foundation. The carding machine may be considered as a convenient frame to support the clothing so that it may operate at maximum efficiency. Typically, the opposing moving beds of needles are wrapped on a large main cylinder, which is the heart of the card, and a large number of narrow flats, also referred to as the "scrambler rolls," which are held on an endless belt that is placed over the top of the main cylinder.

The needles of the two opposing surfaces are inclined in opposite directions and move at different speeds relative to each other. The main cylinder moves at a higher surface speed than the flats. The clumps between the two beds of needles are separated into fibers and are aligned in the machine direction as each fiber is theoretically held at each end by individual needles from the two beds. The individualized fibers engage each other randomly, and with the help of their crimp, form a coherent web at and below the surface of the needles of the clothing on the main cylinder.

As will be appreciated by the skilled artisan, the carding machine includes a mechanism for adjusting the speed of the rolls relative to one another. In manufacturing nonwoven carded fabrics, it is typically desirable that the fibers are laid down randomly to form the carded web and are not highly oriented. Accordingly, the carding machine is typically adjusted so that the scrambler rolls provide a high scramble ratio, i.e., a large number of fibers having a transverse orientation to the machine direction of the fabric. In fact, cards are available which are very wide, i.e., as much as 400 cm; can be run at high speeds, e.g., as much as 150 m/min.; produce webs with low long-to-cross orientation ratios; and are less susceptible to becoming highly oriented by drafting than conventional textile cards.

The degree of scramble, or transverse orientation, can be expressed as a ratio of tensile strength of the fabric in the machine direction (MD) as compared to the tensile strength in the cross-machine direction (CD) of the carded web (expressed as MD/CD grams/inch). Carding machines for nonwovens can be adjusted to provide a scramble ratio of, for example, about 2/1 to about 10/1. Higher ratios may be achieved, i.e., up to about 20:1.

In contrast to typical nonwoven carding procedures, in the present invention, the carded web is formed so that the fibers are highly oriented in the machine direction, i.e., so that the number of fibers laid down transverse to the machine direction are controlled. The degree of orientation of the fibers of the carded webs used in accordance with the present invention can be expressed as a function of the ratio of the tensile strength of the carded web in the machine direction to that in the cross-machine direction. Preferably the carded webs used in accordance with the invention have a tensile strength ratio of at least about 4/1 and preferably at least about 6/1.

Web 12 is moved by forming screen 14 in the longitudinal direction by rolls 16. A conventional supply system including a supply roll 18 deposits an elastomeric layer 20 onto carded layer 12. Elastomeric layer 20 may be, for example, an elastomeric net, an elastic meltblown web, an elastic apertured film, and the like. As used herein, and only for purposes of this application, the term "elastomeric" is used with reference to nonwoven layers capable of substantial recovery, i.e., greater than about 75%, preferably greater than about 90% recovery, when stretched in an amount of about 10% at room temperature expressed as:

$$\% \ recovery = (L_s - L_r)/(L_s - L_o) \times 100$$

where: $L_s$ represents stretched length; $L_r$ represents recovered length measured one minute after recovery; and $L_o$ represents original length of material.

For purposes of illustration only, elastomeric layer 20 is illustrated in FIG. 1 as an elastomeric net. The elastomeric net includes spaced apart longitudinal (i.e. machine direction) and transverse (i.e. cross-machine direction) strands which intersect to form apertures. In addition, irregular geometry nets such as diamond nets and the like can be used in place of net 20. With a rectangular net, for example, one or both of the longitudinal or transverse groups of strands are formed of a thermoplastic or cross-linked elastomeric material such as a polyurethane, a styrenic triblock copolymer, or the like, as discussed in greater detail later. Preferably, the longitudinal and transverse strands are provided in an amount such that there are between about 2 and about 30 or more strands per inch, more preferably about 5 to about 20 strands per inch.

As the elastomeric layer 20 is deposited onto carded web 12, a two layer structure 22 is formed and is conveyed by forming screen 14 in the longitudinal direction as indicated in FIG. 1. A second carding apparatus 24 deposits a second carded fibrous layer 26 preferably comprising binder fibers onto the composite layered structure 22 to thereby form a three-layer composite structure 28 consisting of a carded web/elastomeric layer/carded web. The type of binder fibers and other fibers, as well as the percentage thereof, making up carded web 26 can be the same or different as compared to the fibers in carded web 12. Preferably, the binder fibers are highly oriented in the machine direction of carded web 26, to provide a second carded web comprising fibers that are also substantially oriented in the machine-direction.

The three-layer composite web 28 is conveyed longitudinally as shown in FIG. 1 to a hydroentangling station 30 wherein a plurality of manifolds 32, each including one or more rows of fine orifices, direct high pressure jets through the composite web 28 to intimately hydroentangle the fibers in the webs 12 and 26 with each other and with elastomeric layer 20. As a result of the hydroentangling treatment, at least a portion of the fibers in each of the carded layers 12 and 26 extend through elastomeric layer 20, for example through apertures in the elastomeric net and into the carded layer on the other side of the net.

The hydroentangling station 30 is constructed in a conventional manner as known to the skilled artisan and as described, for example, in U.S. Pat. No. 3,485,706 to Evans, which is hereby incorporated by reference. As known to the skilled artisan, fiber hydroentanglement is accomplished by jetting liquid, typically water, supplied at a pressure from about 200 psig up to about 1800 psig or greater, to form fine, essentially columnar liquid streams. The high pressure liquid streams are directed to at least one surface of the composite layered structure. The composite is supported on a foraminous support stream 34 which can have a pattern to form a nonwoven structure with a pattern or with apertures, or the screen can be designed and arranged to form a hydraulically entangled composite which is not patterned or apertured. The laminate can be passed through a second hydraulic entangling station to enable hydraulic entanglement on the other side of the composite fabric.

During the hydroentanglement treatment, the binder fibers and the staple or natural fibers, when present, in carded web layers 12 and 26 are forced into and/or through the elastomeric layer 20. Preferably, the hydroentangling treatment is sufficient to force at least a portion of the binder fibers present in at least one of the layers 12 and 26 into and/or through the elastomeric layer 20, for example, through the apertures of the elastomeric net. More preferably, the hydroentangling treatment is sufficient to force at least a portion of the binder fibers in both carded layers 12 and 26 into and/or through the elastic layer 20, for example, through the apertures in the elastomeric net. It is also desirable and preferred that other fibers, when present, such as staple and/or natural fibers in webs 12 and 26 are forced into and through elastic layer 20, i.e, the apertures of the elastomeric net. Although a network of fibers as described above is formed during hydroentanglement treatment, advantageously a layering effect occurs wherein the anisotropic properties of the composite in the Z direction are preserved.

The elastomeric layer 20 remains in a substantially planer arrangement during the hydroentangling treatment. Thus, for example, when the elastic layer is a net, the longitudinal and transverse strands, i.e. machine direction (MD) and cross-machine direction (CD) strands, respectively, of the elastomeric net undergo little if any movement in the cross-sectional direction, i.e. the Z-direction, within the web. Similarly, when elastic layer 20 is an elastic meltblown web or an elastic apertured film, the web and/or film undergo little if any movement in the cross-sectional direction, i.e. the Z-direction, within the web. Thus, the elastomeric layer remains in a discrete interior cross-sectional portion of the composite web.

A condensed, hydraulically entangled composite product 36 exits the hydroentanglement station 30, and is dried at a conventional drying station (not shown) and is then directed into a thermal treatment station 40, shown in FIG. 1 as heated calender rolls 42 and 44. The operating temperature of heated rolls 42 and 44 should be adjusted to a surface temperature such that the binder fibers present in the composite product 36 are thermally activated to bind the composite web into a coherent, unitary structure. On the other hand, the heat transfer conditions are advantageously maintained to avoid thermal degradation or melting of the elastomeric layer 20 which is present within the interior of the composite product 36. The bonding conditions can, in some instances depending on the fibers and layer used, be controlled to obtain fiber bonding to the layer, while simultaneously avoiding thermal degradation of the elastomer or its stretch and recovery properties.

While softening of the elastomeric layer 20 can, in some instances, be desirable and helpful for bonding of the binder fibers and/or staple fibers in the composite web to the layer, melting of the elastomeric layer is advantageously avoided. While the bonding between the binder fibers and/or other natural or staple fibers present in the composite product 36 to the elastomeric layer 20 can substantially improve the overall coherency and unitary structure of the ultimate thermally-bonded composite, it has been found that melting and/or thermally degrading the elastomeric layer 20 decreases both the strength and elasticity of the thermally-bonded composite.

A thermally-bonded composite elastic web 46 is removed from the nip of the heated rolls 42 and 44 and wound by conventional means onto roll 48. The composite elastic web 46 can be stored on roll 48 without substantial harm to the fabric due to the phenomenon of creep; that is, deformation that is time dependent and is exhibited by many elastomeric materials subjected to a continuing load. In many cases, creep deformation may not be recoverable following removal of the applied load. With the fabric 46 stored on roll 48, the oriented and heat activated binder fibers resist elongation of the fabric in the machine direction of the layer and therefore the elastomeric components of the layer are not subjected to stress during storage on roll form. The composite elastic fabric 46 can be stored on roll 48 or immediately passed to end use manufacturing processes, for example for use in bandages, diapers, disposable undergarments, personal hygiene products and the like.

The method illustrated in FIG. 1 is susceptible to numerous preferred variations. For example, although the schematic illustration of FIG. 1 shows carded webs being formed directly during the in-line process, it will be apparent that the carded webs can be preformed and supplied as rolls of preformed webs. Similarly, although the elastomeric layer is shown being supplied as a roll of a preformed net, the layer can be formed directly in-line. Similarly, although FIG. 1 illustrates use of fibrous webs 12 and 26 both above and below the elastomeric layer 20, only a single fibrous web such as web 12 can be employed or more than two fibrous webs can be employed.

The hydroentanglement station 30 is a preferred process step for securing elastomeric layer 20 to one or more fibrous webs 12 and 26. However, in other embodiments of the invention, the fibrous webs 12 and/or 26 can be combined with elastomeric layer 20 by lamination including solvent-based adhesive and/or thermal adhesive lamination, thermal bonding, needling, and/or other well known textile processes. When thermal bonding is used to combine the layers, any of the thermal bonding techniques described herein, such as heated calender rolls, through air bonding, and the like, can be used. Preferably, the layers when thermally bonded are bonded using a heated patterned calendar roll. Such conventional thermal bonding techniques are known to those skilled in the art.

The heated calender rolls 42 and 44 can, in other embodiments of the invention, be replaced by other thermal activation zones, for example in the form of a through-air bonding oven or in the form of a microwave or other RF treatment zone. An especially preferred through-air bonding treatment employs support screens both above and below the fabric and contacting both surfaces thereof during passage through the oven. The screens are advantageously metallic screens resulting in conductive heating of both fabric surfaces by contact with the upper and lower metal screens, respectively. Other heating stations such as ultrasonic welding stations can also be advantageously used in the invention. Such conventional heating stations are known to those skilled in the art and are capable of effecting substantial thermal fusion of the binder fibers present in the composite product 36.

Nonwoven webs other than carded webs can also be employed in the production of fabrics of the invention. Nonwoven staple webs can be formed by air laying, garnetting, wet laying and similar processes known in the art can be substituted for either of carded webs 12 and 26 and/or can be used in combination with one or both of carded webs 12 and 26. Similarly, spunbonded webs which are extensible in the CD direction because of high MD filament orientation, as well as meltblown webs, can be substituted for either of carded webs 12 and 26 and/or can be used in combination with one or both of carded webs 12 and 26.

Other nonwoven fibrous webs which comprise highly oriented fibers or filaments may also be used in accordance with the present invention to achieve a composite nonwoven fabric which is elastic in the cross-machine direction and substantially nonextensible in the machine direction. As will be appreciated by those skilled in the art, spunbonded webs can be formed having a high degree of filament orientation in the machine direction. Various spunbonding techniques exist, but all typically include the basic steps of extruding continuous filaments, quenching the filaments, drawing or attenuating the filaments by a high velocity fluid, and collecting the filaments on a surface to form a web. Exemplary spunbonding processes known in the art include Lurgi spunbonding processes, wherein multiple round or tube-shaped venturi nozzles attenuate the filaments, and slot draw spunbonding processes, wherein the multiple tube attenuators are replaced with a slot-shaped attenuator which extends widthwise of the machine.

Any of the spunbonding techniques known in the art may be used in the present invention. Exemplary spunbonding techniques are described, for example, in U.S. Pat. Nos. 4,340,563 and 4,405,297 to Appel, et al. and U.S. Pat. No. 4,692,106 to Grabowski, et al. The spunbonded webs may be preformed or formed in-line.

Any polymer or polymer blend which is capable of being melt spun to form substantially continuous filaments may be used in this embodiment of the present invention. Examples of polymers which may be suitably used to form spunbonded webs include polyester, acrylic, polyamide, polyolefin such as polyethylene, polypropylene, copolymers of the same, or the like, or other thermoplastic polymers, as well as copolymers and blends of these and other thermoplastic polymers.

In this embodiment of the present invention, the spunbonded web advantageously includes binder filaments, preferably in an amount between about 5 and 50 wt. %, more preferably between about 10 and about 40 wt. %, most preferably between about 15 and 30 wt. %. Binder filaments are known in the art and include filaments made from low melting polymers. Preferably, the binder filaments are single constituent spunbonded filaments comprising a low melt polymer or polymer blend. Alternatively, the binder filaments can be bicomponent and multi-component spunbonded filaments such as sheath/core, side-by-side, sectorized or similar bicomponent filaments wherein at least one component of the filament is a low melting material such as a polyethylene, a copolyester, a copolyamide, or the like. The composition and properties of such binder filaments are known in the art and are similar to the description set forth in more detail below with regard to binder fibers.

To form the highly oriented spunbonded fabrics in accordance with this embodiment of the present invention, the filaments are laid down on the forming screen or wire so that they are highly oriented in the machine direction. Such orientation of the filaments can be achieved by adjusting the filament velocity of the filaments relative to the velocity of the forming wire. As will be appreciated by the skilled artisan, typically the relative velocities are such that a high degree of random distribution of the filaments is achieved as the filaments are deposited onto the screen. This is typically viewed as desirable because good coverage can thus be achieved. In contrast, in this embodiment of the present invention, the filament velocity is adjusted so that it is slower than the forming wire velocity. Preferably, the relative velocities of the filament deposition and the forming wire are adjusted so that the resultant spunbonded fabric exhibits a fabric tensile strength ratio of machine direction tensile strength (MD) as compared to the tensile strength of the fabric in the cross machine direction (CD), expressed as MD/CD grams per inch, of at least about 2/1. Thus, in contrast to typical spunbonding procedures, the spunbonded webs in accordance with this embodiment of the present invention are formed so that the filaments are highly oriented in the machine direction, and are not substantially randomly distributed throughout the web.

In addition, as noted above, nonwoven elastic layers other than elastic nets can be employed in the production of fabrics of the invention. For example, nonwoven elastic meltblown webs, elastic spunbonded webs, and elastic apertured and non-apertured films can be substituted for the elastomeric net 20.

The elastomeric net can be prepared by various well known processes including the process disclosed in U.S. Pat. No. 4,636,419, issued Jan. 13, 1987 to Masden et al., incorporated herein by reference. In general the elastomeric net is made by extruding a plurality of elastomeric or non-elastomeric filaments in the machine direction while simultaneously or thereafter extruding and joining to the machine direction filaments, a plurality of elastomeric filaments oriented in the cross-machine direction.

Elastomeric meltblown webs may be produced using conventional meltblowing processes and apparatus as known in the art, for example, those disclosed in U.S. Pat. No. 3,849,241 to Buntin, et al. and U.S. Pat. No. 4,048,364 to Harding, et al. In meltblowing, thermoplastic resin, here an elastomeric resin, is fed into an extruder where it is melted and heated to the appropriate temperature required for fiber formation. The extruder feeds the molten resin to a special meltblowing die. The resin emerges from the die orifices as molten threads into a high velocity stream of gas, usually air. The air attenuates the polymer into a blast of fine fibers which are collected on a moving screen placed in front of the blast. As the fibers land on the screen, they entangle to form a cohesive web.

Elastomeric spunbonded webs employed in accordance with the present invention preferably are formed in accordance with the teachings of U.S. patent application Ser. No. 07/829,923 of Gessner, et al.; filed Feb. 3, 1992; and entitled "Elastic Nonwoven Webs and Method of Making Same", which is hereby incorporated in its entirety into this application by reference.

Elastomeric spunbond layers are preferably produced by melt spinning substantially continuous filaments of a thermoplastic olefin-based elastomer. These olefinic elastomers are formed using metallocene polymerization catalysis and are commercially available as the EXACT resins from Exxon, which are linear low-density polyethylenes, and the CATALLOY resins from Himont, which are crystalline olefin, heterophasic copolymers including a crystalline base polymer fraction, i.e., block, and an amorphous copolymer fraction or block with elastic properties as a second phase blocked to the crystalline base polymer fraction via a semi-crystalline polymer fraction. Preferably the spunbond fabrics are prepared by conducting a slot draw spunbonding process at a rate of less than 2000 meters per minute, e.g., less than 1500 m/min. employing an elastomeric thermoplastic resin as feed.

Figure 2:
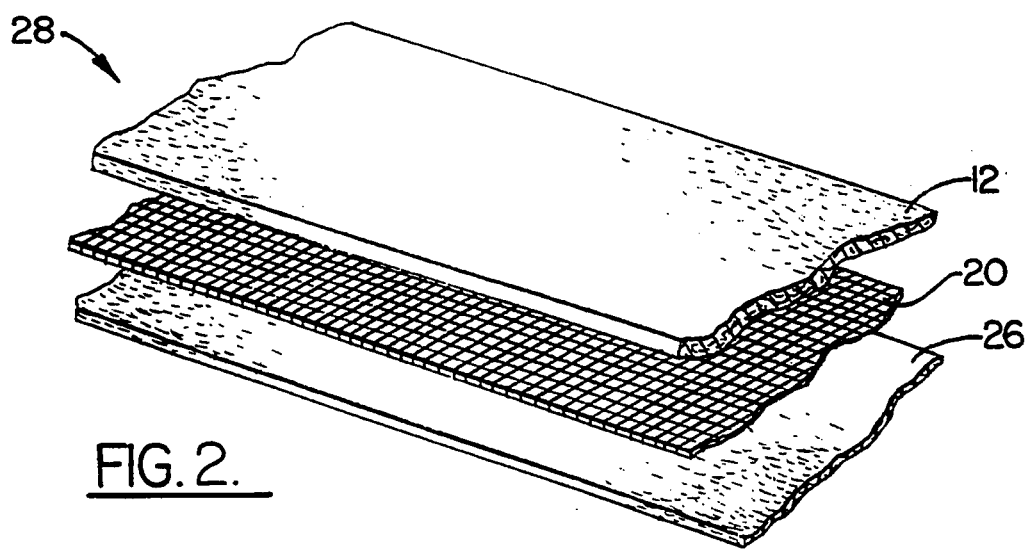
FIG. 2 is an exploded view of one preferred fabric according to the invention.

Referring now back to the composite fabric formed as described in FIG. 1, FIG. 2 illustrates an exploded view of the three layered structure 28 of FIG. 1 prior to hydroentanglement. At least one of the carded web layers 12 and 26 comprises binder fibers in an amount between about 5 and 50 wt. %, more preferably between about 10 and about 40 wt. %, most preferably between about 15 and 30 wt. %. Binder fibers are known in the art and include fibers made from low melting polyolefins such as polyethylenes; polyamides and particularly copolyamides; polyesters and particularly copolyesters; acrylics and the like. The binder fiber may have a higher or lower activation temperature than the melting or softening point of the elastomeric layer. In the case that the binder fiber activates above the glass transition temperature of the hard segment of the thermoplastic elastomer, then heating conditions must be closely controlled to bind the fibers without deforming or degrading the layer.

Particularly preferred binder fibers include bicomponent and multi-component fibers such as sheath/core, side-by-side, sectorized or similar bicomponent fibers wherein at least one component of the fiber is a low melting material such as a polyethylene, a copolyester, a copolyamide, or the like. Particularly preferred bicomponent fibers have a melting temperature for the binder portion of the fiber in the range of between about 100° and 135° C. Such fibers include polyethylene/polypropylene and polyethylene/polyester sheath/core fibers and copolyester/polyester sheath/core fibers. One particularly preferred binder fiber is a copolyester/polyester sheath/core fiber having a melting point of about 110° C. commercially available from Hoechst-Celanese Corporation as "K-54".

Preferably, each of webs 12 and 26 also include staple and/or natural fibers such as fibers formed from polyester, polyolefins such as polypropylene or polyethylene, nylon, acrylic, modacrylic, rayon, cellulose acetate, biodegradable synthetics such as a biodegradable polyester, aramide, fluorocarbon, polyphenylene sulfide staple fibers and the like. Preferred natural fibers include wool, cotton, wood pulp fibers and the like. Blends of such fibers can also be used. In addition, all or a portion of the staple fibers can be glass, carbon fibers or the like.

As indicated previously, the binder fibers are preferably present in an amount of between about 5 and 50 wt. %, more preferably between about 10 and about 40 wt. %, most preferably between about 15 and 30 wt. %. The content of the binder fiber is adjusted to provide coherency to the overall combined web without adding an undesirably stiff or boardy feeling to the web. The specific content of the binder fiber will be dependent, at least to some extent, on the type of binder fiber used and on the type of staple fiber used.

Suitable elastomers for forming the elastic layer, such as an elastic net, elastic meltblown web or elastic apertured film, include the diblock and triblock as well as radial and star copolymers based on polystyrene (S) and unsaturated or fully hydrogenated rubber blocks. The rubber blocks can consist of butadiene (B), isoprene (I), or the hydrogenated version, ethylene-butylene (EB). For example, S—B, S—I, S—EB, as well as S—B—S, S—I—S, and S—EB—S linear block copolymers can be used. Typically when diblock copolymers are used, these may be blended with the triblock or radial elastomers. Preferred elastomers of this type include the KRATON polymers sold by Shell Chemical Company or the VECTOR polymers sold by DEXCO. Other elastomeric thermoplastic polymers include polyurethane elastomeric materials such as ESTANE sold by BF Goodrich Company; polyester elastomers such as HYTREL sold by E.I. Du Pont De Nemours Company; polyetherester elastomeric materials such as ARNITEL sold by Akzo Plastics; and polyetheramide elastomeric materials such as PEBAX sold by ATO Chemе Company. Other elastomers include copolymers of ethylene with alpha olefins such as butene-1, hexene-1, octene-1 and the like prepared using single-site or "metallocene" polymerization catalysts, such as the EXACT resins provided by Exxon Chemical.

The elastomeric layer can also be prepared from blends of thermoplastic elastomers with other polymers such as polyolefin polymers, e.g. blends of KRATON polymers with polyolefins such as polypropylene and polyethylene, and the like. These polymers can provide lubrication and decrease melt viscosity, allow for lower melt pressures and temperatures and/or increase throughput, and provide better bonding properties too. In a particularly preferred embodiment of the invention, polymers can be included in the blend as a minor component, for example in an amount of from about 5% by weight up to about 50% by weight, preferably from about 10 to about 30% by weight. Suitable thermoplastic materials include poly(ethylene-vinyl acetate) polymers having an ethylene content of up to about 50% by weight, preferably between about 15 and about 30% by weight, and copolymers of ethylene and acrylic acid or esters thereof, such as poly(ethylene-methyl acrylate) or poly(ethylene-ethyl acrylate) wherein the acrylic acid or ester component ranges from about 5 to about 50% by weight, preferably from about 15 to 30% by weight. In addition, polystyrene and poly($\alpha$-methyl styrene) can be used.

When the elastomeric layer is an elastic net, in many instances, it is desirable that the number of strands per inch in the longitudinal and transverse dimensions be different. Generally, there are between about 2 to about 30 strands per inch in both the longitudinal and transverse directions although greater numbers of strands can be employed where desirable. In some instances, the fabric of the invention can be used in articles wherein an edge of the fabric is exposed. In such instances it can be desirable to minimize the diameter of the strands which will be exposed along the cut edge of the fabric. Generally, the elastomeric nets used in the invention will have a basis weight ranging from about 15 grams per square meter, to about 200 grams per square meter, more preferably from about 35 to about 75 grams per square meter and can employ strands having diameters ranging from 50 to 600 microns.

As indicated previously, the fabrics of the invention can also incorporate spunbonded nonwovens, including polyolefin, nylon, polyester, copolymers of the same and other such webs as are known to those skilled in the art. Similarly, meltblown nonwovens including both elastomeric and non-elastomeric meltblown webs prepared from polyolefins, nylon, polyesters, random and block copolymers, elastomers and the like are also employed in fabrics of the invention.

Figure 3:
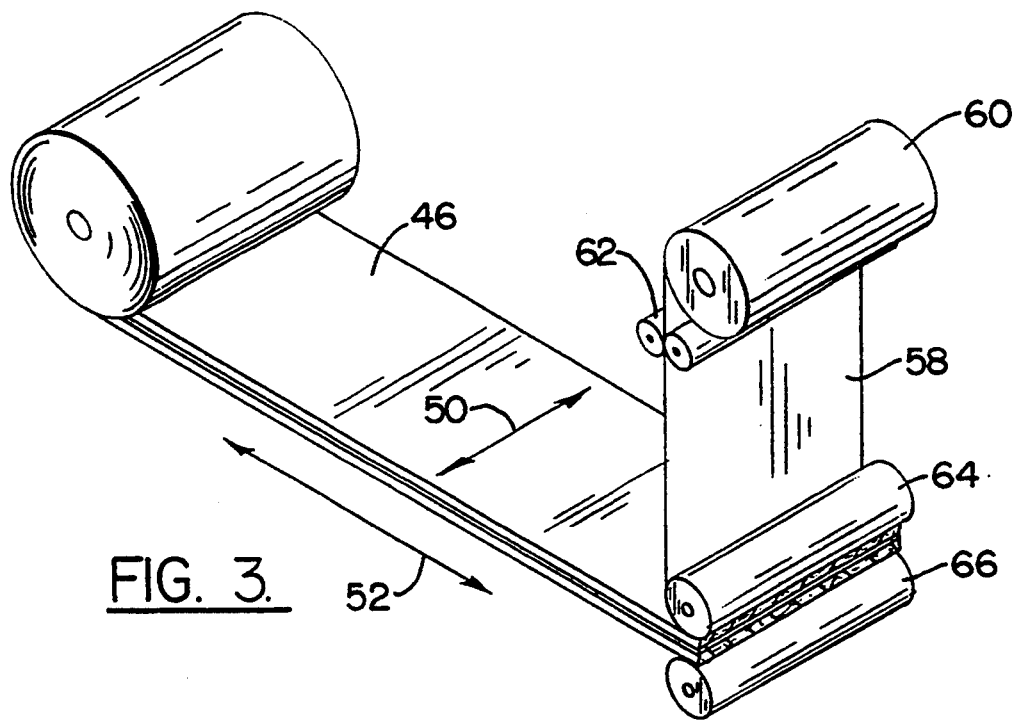
FIG. 3 is a schematic illustration of a process wherein a fabric of the invention is laminated to a second fabric or film layer.

FIG. 3 illustrates an exemplary end-use process for a fabric 46 of the invention. The fabric 46 is substantially elastic in the cross-machine direction as indicated by arrow 50 and is substantially non-extensible in the machine direction as illustrated by arrow 52. The fabric 46 can be supplied via a roll to a lamination process as illustrated in FIG. 3. A second film or fabric 58 is supplied from roll 60 for lamination with the fabric 46. An adhesive material may be applied to the film or fabric 58 via one or more rolls 62 by conventional apparatus known to those skilled in the art. A pair of calendar rolls 64 and 66, which may be heated, are used to bond the film or fabric 58 to the elastic fabric 46 of the invention.

As is apparent to the skilled artisan, during the lamination process illustrated in FIG. 3, the fabric 46 is subjected to tension in the machine direction. During a typical lamination process, if an elastic fabric is stretched due to elasticity, the film or fabric layer 58 will be gathered following relaxation of the laminate. In addition, when elastomeric materials are stretched during heating, for example, by contact with heated calender rolls 64 and 66, a failure of elastic properties can result. Nonwoven fabrics with elastomeric materials in the machine direction are difficult to process, typically stretching under tension, which can interfere with steps such as cutting and the like.

In contrast, because the fibers or filaments of the fibrous web are highly oriented in the machine direction, the composite fabric made from the nonwoven fibrous web has a differential stretch in the machine and cross-machine directions prior to and following thermal activation of the binder fibers. Specifically, the fabric exhibits low extensibility in the machine direction, but is extensible in the cross-machine direction. This allows control of the stretch and coverage of the fabric. That is, as the nonwoven fabric of the invention is manufactured and processed, because of the limited elongation imparted by the fibrous web in the machine direction, the resultant composite elastic fabric is less susceptible to substantial harm to the fabric due to stretching, creep, and the like.

Further, the provision of highly oriented binder fibers or filaments in the machine direction results in improved coverage when the composite fabric is elongated. The elongated fabric undergoes stretch primarily in the cross-machine direction, and returns back to its original shape with no void formation and reduced fabric opacity.

The following examples are provided to illustrate the fabrics of the invention and processes for making them but are not to be construed as limitations on the invention.

EXAMPLES

Four elastic nonwoven webs were made to demonstrate the effect of scramble ratio and thermal bonding on tensile and elastic properties. The composite elastic nonwoven fabrics were made by first forming a carded web consisting of an intimate blend of two fibers: 50% 1.35 dpf×1.5" polyester staple fibers (Type-180 fiber available from Hoechst Celanese); and 50% 2.2 dpf×1.5" bicomponent binder fibers available from Hoechst Celanese under the trade designation "K-54".

This intimate blend of fiber was carded on both sides of an elastic scrim. The card web basis weight was 33 g/m² on each side, to give a total fibrous web basis weight of 66 g/m². The elastic scrim had a basis weight of 145 g/m² and was made from a styrenic thermoplastic elastomer (Kraton D, from Shell Chemical).

The carding conditions were adjusted to yield different scramble ratios. As shown in Table 1 below, the scramble ratios varied from 3.7/1 up to 9.5/1. The unbonded trilaminate was then hydroentangled on both sides at moderately high pressure (four manifolds on each side at a pressure of 1600 psi, with a 5 mil, 40 hole/inch spunlace strip). The material was then dried in a through-air oven. Some samples were also post-treated with through-air thermal bonding, with an oven temperature of 305° F.

Table 1 summarizes the web elongation in the machine direction of the composite elastic fabric at low load. At these low load values, the materials are subjected to stress within their proportional limit. Therefore, the load versus elongation relationship is substantially linear.

From this data, it is clear the inclusion of thermally activated binder fibers, and in particular these fibers oriented highly in the machine direction ("MD"), yields an elastic nonwoven web that has very low MD extensibility.

Importantly, this low MD extensibility is achieved in the MD without sacrificing cross machine ("CD") elasticity. Table 2 (below) is a summary of a two-cycle hysteresis test performed on these webs. The low extensibility in the machine direction was obtained with no increase in permanent set of the nonwoven composite. Typically, when elastic composites are thermally activated, there is an increase in the permanent set.

Secondly Table 2 reveals the benefits of the invention as it relates to tensile properties. High tensile strength in some elastic applications can be seen as detrimental, i.e., the material resists stretch. The thermally activated materials of the present invention display higher tensile strength (i.e., resistance to stretch) than the non-activated materials on the first cycle only. This higher tensile strength disappears in the second cycle. Thus, with subsequent stretching of the nonwoven composite, there is no detrimental increase in tensile strength, with corresponding higher resistance to elongation. Thus, we achieve low machine direction extensibility without the "penalty" of low cross-machine direction extensibility.

Finally, another benefit can be seen with the current invention. There is a "force wall" in the thermally activated samples. The composite of the invention stretches easily in the cross-machine direction up to the desired elongation (in this case, 100% elongation). At this desired elongation, the tensile strength of the material increases rapidly. This "force wall" inhibits any further, potentially destructive elongation.

The invention has been described in considerable detail with reference to its preferred embodiments. It will be apparent, however, that the invention is susceptible to numerous modifications and variations without departure from the spirit and scope of the invention as described in the foregoing specification and defined in the appended claims.

TABLE 1

| MD WEB ELONGATION AT SPECIFIED LOAD | | | | |
|---|---|---|---|---|
| | Sample 1 | Sample 2 | Sample 3 | Sample 4 |
| Scramble Ratio | 3.7/1 | 7.9/1 | 5.5/1 | 9.5/1 |
| Thermal Treatment[1] | • | • | ✓ | ✓ |
| Force (N/in) | Elongation (%) | | | |
| 0.00 | 0% | 0% | 0% | 0% |
| 0.05 | 0.32% | 0.28% | 0.05% | 0.03% |
| 0.10 | 0.65% | 0.57% | 0.10% | 0.06% |
| 0.15 | 0.97% | 0.85% | 0.15% | 0.09% |
| 0.20 | 1.30% | 1.14% | 0.19% | 0.13% |
| 0.25 | 1.62% | 1.42% | 0.24% | 0.16% |
| 0.30 | 1.95% | 1.71% | 0.29% | 0.19% |
| 0.35 | 2.27% | 1.99% | 0.34% | 0.22% |
| 0.40 | 2.60% | 2.28% | 0.39% | 0.25% |

TABLE 1-continued

| MD WEB ELONGATION AT SPECIFIED LOAD | | | | |
|---|---|---|---|---|
| | Sample 1 | Sample 2 | Sample 3 | Sample 4 |
| 0.45 | 2.92% | 2.56% | 0.44% | 0.28% |
| 0.50 | 3.25% | 2.85% | 0.49% | 0.31% |
| 0.55 | 3.57% | 3.13% | 0.53% | 0.35% |
| 0.60 | 3.90% | 3.42% | 0.58% | 0.38% |
| 0.65 | 4.22% | 3.70% | 0.63% | 0.41% |
| 0.70 | 4.55% | 3.99% | 0.68% | 0.44% |
| 0.75 | 4.87% | 4.27% | 0.73% | 0.47% |
| 0.80 | 5.19% | 4.56% | 0.78% | 0.50% |
| 0.85 | 5.52% | 4.84% | 0.83% | 0.53% |
| 0.90 | 5.84% | 5.13% | 0.87% | 0.56% |
| 0.95 | 6.17% | 5.41% | 0.92% | 0.60% |
| 1.00 | 6.49% | 5.69% | 0.97% | 0.63% |

• No thermal treatment
∕ Binder fibers thermally activated

TABLE 2

| CD ELASTICITY TWO-CYCLE HYSTERESIS AT 100% ELONGATION | | | | |
|---|---|---|---|---|
| | Sample 1 | Sample 2 | Sample 3 | Sample 4 |
| Scramble Ratio | 3.7/1 | 7.9/1 | 5.5/1 | 9.5/1 |
| Thermal Treatment[1] | • | • | ∕ | ∕ |
| First Cycle, Load (N/in) | | | | |
| 25% elongation | 2.07 | 2.12 | 4.65 | 3.80 |
| 50% elongation | 3.12 | 3.12 | 8.04 | 6.89 |
| 75% elongation | 3.88 | 3.84 | 10.62 | 9.41 |
| 100% elongation | 4.51 | 4.38 | 11.93 | 11.26 |
| First Cycle, Unload (N/in) | | | | |
| 25% elongation | 1.09 | 1.18 | 0.88 | 0.92 |
| 50% elongation | 2.03 | 2.08 | 1.88 | 1.94 |
| 75% elongation | 2.74 | 2.75 | 2.84 | 2.84 |
| 100% elongation | 4.00 | 3.93 | 9.36 | 8.88 |
| Second Cycle, Load (N/in) | | | | |
| 25% elongation | 1.56 | 1.64 | 1.51 | 1.50 |
| 50% elongation | 2.55 | 2.58 | 2.73 | 2.67 |
| 75% elongation | 3.28 | 3.27 | 4.44 | 4.15 |
| 100% elongation | 4.18 | 4.11 | 10.62 | 9.96 |
| Second Cycle, Unload (N/in) | | | | |
| 25% elongation | 1.04 | 1.13 | 0.83 | 0.89 |
| 50% elongation | 1.99 | 2.02 | 1.82 | 1.89 |
| 75% elongation | 2.68 | 2.69 | 2.72 | 2.76 |
| 100% elongation | 3.83 | 3.80 | 8.84 | 8.36 |
| Percent Set (%) | 4.2% | 4.9% | 3.7% | 4.3% |

• No thermal treatment
∕ Binder fibers thermally activated

That which is claimed is:

1. A process stable composite elastomeric nonwoven fabric of predetermined width and having a length substantially greater than said width, said width defining the cross machine direction of said fabric and said length defining the machine direction of said fabric, said composite fabric comprising:
    a fibrous web comprising a plurality of thermally activated binder fibers or filaments oriented substantially in the machine-direction of said fibrous web; and
    an elastomeric layer combined with said fibrous layer, wherein said composite elastomeric nonwoven fabric is elastic in the cross-machine direction and exhibits low extensibility in the machine direction.

2. The composite nonwoven fabric according to claim 1 wherein the machine direction of said fabric has an extensibility of less than about 2% elongation with a tension of about 0.9 N/inch at 25° C.

3. The composite nonwoven fabric according to claim 1 wherein said binder fibers or filaments are present in said fibrous web in an amount of at least about 5 wt. %.

4. The composite nonwoven fabric according to claim 1 wherein said fibrous web is a carded web.

5. The composite fabric according to claim 4 wherein said carded web has a tensile strength in the machine direction of at least about four times greater than the tensile strength thereof in the cross-machine direction.

6. The composite nonwoven fabric according to claim 1 wherein said fibrous web is a spunbonded web.

7. The composite nonwoven fabric according to claim 1 wherein said elastomeric layer is an elastomeric net.

8. The composite nonwoven fabric according to claim 1 wherein said elastomeric layer is an elastic meltblown web.

9. The composite nonwoven fabric according to claim 1 wherein said elastomeric layer is an elastic film.

10. The composite nonwoven fabric according to claim 1 wherein said elastomeric layer is an elastic spunbonded web.

11. The composite nonwoven fabric according to claim 1 wherein said elastomeric layer is combined with said fibrous web by hydroentangling.

12. The composite nonwoven fabric according to claim 1 wherein said elastomeric layer is combined with said fibrous web by thermal bonding.

13. The composite nonwoven fabric according to claim 1 wherein at least a portion of said binder fibers or filaments are thermally activated to bond said fabric into a coherent substantially unitary structure.

14. The composite nonwoven fabric according to claim 1 further comprising at least a second fibrous web combined with said fibrous layer and said elastomeric layer.

15. The composite nonwoven fabric according to claim 1 further comprising a nonwoven web selected from the group consisting of spunbonded webs and meltblown webs combined with said fibrous layer and said elastomeric layer.

16. A process stable composite elastomeric nonwoven fabric of predetermined width and having a length substantially greater than said width, said width defining the cross machine direction of said fabric and said length defining the machine direction of said fabric, said composite fabric comprising:
    a carded web comprising a plurality of thermally activated binder fibers oriented substantially in the machine-direction of said carded web; and
    an elastomeric layer combined with said fibrous layer, wherein said composite elastomeric nonwoven fabric is elastic in the cross-machine direction and exhibits low extensibility in the machine direction.

17. The composite nonwoven fabric according to claim 16 wherein the machine direction of said fabric has an extensibility of less than about 2% elongation with a tension of about 0.9 N/inch at 25° C.

18. The composite fabric according to claim 16 wherein said fibrous nonwoven web has a tensile strength in the machine direction of at least about four times greater than the tensile strength thereof in the cross-machine direction.

19. The composite nonwoven fabric according to claim 16 wherein said binder fibers are present in said fibrous web in an amount of at least about 5 wt. %.

20. The composite nonwoven fabric according to claim 16 wherein said elastomeric layer is selected from the group consisting of elastomeric nets, elastic meltblown webs, elastic films, and elastic spunbonded webs.

21. The composite nonwoven fabric according to claim 16 wherein said elastomeric layer is combined with said fibrous web by hydroentangling.

22. The composite nonwoven fabric according to claim 16 wherein said elastomeric layer is combined with said fibrous web by thermal bonding.

23. A process stable composite elastomeric nonwoven fabric of predetermined width and having a length substantially greater than said width, said width defining the cross machine direction of said fabric and said length defining the machine direction of said fabric, said composite fabric comprising:
- a spunbonded web comprising a plurality of substantially continuous filaments oriented substantially in the machine-direction of said spunbonded web; and
- an elastomeric layer combined with said spunbonded layer, wherein said composite elastomeric nonwoven fabric is elastic in the cross-machine direction and exhibits low extensibility in the machine direction.

24. The composite nonwoven fabric according to claim 23 wherein the machine direction of said fabric has an extensibility of less than about 2% elongation with a tension of about 0.9 N/inch at 25° C.

25. The composite fabric according to claim 23 wherein said spunbonded web has a tensile strength in the machine direction of at least about two times greater than the tensile strength thereof in the cross-machine direction.

26. The composite nonwoven fabric according to claim 23 wherein said elastomeric layer is selected from the group consisting of elastomeric nets, elastic meltblown webs, elastic films, and elastic spunbonded webs.

27. The composite nonwoven fabric according to claim 23 wherein said elastomeric layer is combined with said spunbonded web by thermal bonding.

28. A process stable composite elastomeric nonwoven fabric of predetermined width and having a length substantially greater than said width, said width defining the cross machine direction of said fabric and said length defining the machine direction of said fabric, said composite fabric comprising:
- a first and second fibrous web each comprising a plurality of thermally activated binder fibers oriented substantially in the machine-direction of said fibrous webs; and
- an elastomeric net combined with said fibrous webs by hydroentanglement;
- at least a portion of said binder fibers having been thermally activated thereby bonding said hydroentangled first and second fibrous webs into a coherent substantially unitary structure encompassing said elastomeric net,
- and wherein said composite elastomeric nonwoven fabric is elastic in the cross-machine direction and exhibits low extensibility in the machine direction of less than about 2% elongation with a tension of about 0.9 N/inch at 25° C.

* * * * *